N. Lawrence.
Imp<sup>d</sup> Syringe-Valve.

Nº 72508.  Patented Dec. 24, 1867.

Witnesses.
Thos. Inscke.
W<sup>m</sup> Truvin

Inventor.
Nathan Lawrence.
Per Munn & Co
Attorneys.

United States Patent Office.

NATHAN LAWRENCE, OF TAUNTON, MASSACHUSETTS.

Letters Patent No. 72,508, dated December 24, 1867.

IMPROVEMENT IN SYRINGE-VALVES.

*The Schedule referred to in these Letters Patent and making part of the same.*

TO ALL WHOM IT MAY CONCERN:

Be it known that I, NATHAN LAWRENCE, of Taunton, in the county of Bristol, and State of Massachusetts, have invented a new and useful Improvement in Syringe-Valves; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a new manner of securing the valves in the metal valve-cylinder of a syringe, so that the said valve cannot drop out of its place.

The invention consists in securely arranging a pin across the metal cylinder in which the valve is held, whereby the aforesaid object will be attained, or in some other equivalent device. as will be hereinafter more fully described.

A represents the cylindrical metal valve-seat, having a male or female screw, whereby it is secured to a cylindrical metal tube, C. Each of these cylinders is secured to the end of an elastic tube or other portion of an ordinary or any kind of syringe. In the cylinder A is arranged a valve, B, of ordinary construction, resting upon the seat in A. D is a pin or small rod, fixed across the tube, above the face of the valve, and far enough from the same that it can freely move up and down, but which will prevent the valve from dropping out. Frequent loss of the valves is the usual consequence of the omission of this bar in ordinary syringes.

I am aware that such pins are already arranged in that cylinder which is screwed to that in which the valve is arranged for the purpose of preventing the valve from being drawn into the tube. But they are never secured in the same cylinder in which the valve is arranged for the same purpose and for preventing the loss of the valve. When in ordinary syringes, the two cylinders are disconnected, the valve is not confined to its seat, and can easily drop out.

Figure 1:
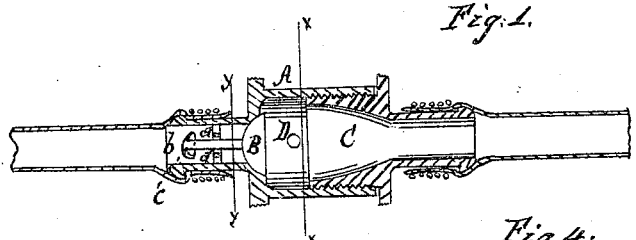
Figure 1 is a longitudinal sectional view of my invention.
Figure 2:
Figure 2 is a cross-section of the same, taken on the line $x\,x$, fig. 1.
Figure 3:
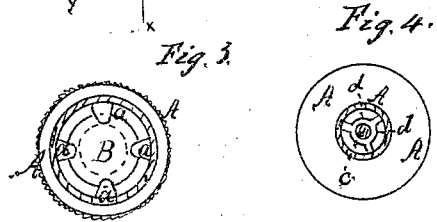
Figure 3 is a similar view as fig. 2, showing a modification of my invention.
Figure 4:
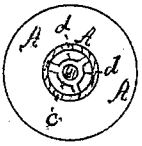
Figure 4 is a cross-section taken on the line $y\,y$, fig. 1.

In place of the pin D, may be arranged, in the inside of the cylinder A, a series of projecting lugs or ears, $a\,a$, as is clearly shown in fig. 3. These lugs will answer the same purpose as the pin D. By forming a small head, $b$, on the end or any part of the valve-stem $c$, and by fitting the said stem through a small ring, $d$, which is soldered or otherwise fastened in the inside of the cylinder A, as is shown in fig. 4, and by red lines in fig. 1, the same object may also be obtained, i. e., the valve cannot drop out, as the head $b$ will strike against the ring $d$. The latter fits around the stem $c$, but its outer diameter is smaller than the inner diameter of the tube A, and it is therefore secured in the same by means of small lugs or pins, as is clearly shown in fig. 4.

I claim as new, and desire to secure by Letters Patent—

The syringe-valve B when placed within the metallic cylinder A, with its stem extending into the smaller portion of the cylinder, and prevented from falling out by means of the transverse rod D or projections $a$, as herein shown and described.

NATHAN LAWRENCE.

Witnesses:
THOMAS WESTON, Jr.,
ORREN M. INGALLS.